US010916742B2

(12) United States Patent
Sakai et al.

(10) Patent No.: US 10,916,742 B2
(45) Date of Patent: Feb. 9, 2021

(54) BATTERY PACK, ELECTRICAL DEVICE, AND CHARGING DEVICE

(71) Applicant: MURATA MANUFACTURING CO., LTD., Kyoto (JP)

(72) Inventors: Hirotaka Sakai, Fukushima (JP); Yasushi Mori, Fukushima (JP); Motoki Katayama, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 146 days.

(21) Appl. No.: 15/919,768

(22) Filed: Mar. 13, 2018

(65) Prior Publication Data

US 2018/0205051 A1 Jul. 19, 2018

Related U.S. Application Data

(63) Continuation of application No. PCT/JP2016/004196, filed on Sep. 14, 2016.

(30) Foreign Application Priority Data

Oct. 30, 2015 (JP) .................................. 2015-214472

(51) Int. Cl.
*H01M 2/10* (2006.01)
*H01R 13/623* (2006.01)
(Continued)

(52) U.S. Cl.
CPC ....... *H01M 2/1016* (2013.01); *H01M 2/1022* (2013.01); *H01M 2/1077* (2013.01);
(Continued)

(58) Field of Classification Search
None
See application file for complete search history.

(56) References Cited

U.S. PATENT DOCUMENTS

| 5,445,900 A * | 8/1995 | Miller, Jr. ........... H01M 2/1055 429/1 |
| 2005/0202310 A1 * | 9/2005 | Yahnker .................. B25F 5/008 429/62 |
| 2006/0267548 A1 | 11/2006 | Uehlein-Proctor et al. |
| 2006/0275655 A1 * | 12/2006 | Shirane ..................... B25F 5/00 429/121 |
| 2007/0257638 A1 * | 11/2007 | Amend ..................... B25F 5/02 320/112 |

(Continued)

FOREIGN PATENT DOCUMENTS

| JP | S61168879 | 7/1986 |
| JP | 2006-321043 A | 11/2006 |
| JP | 2011-222255 A | 11/2011 |

OTHER PUBLICATIONS

Japanese Office Action dated Dec. 4, 2018, in correspondingJapanese Application No. 2017-547350.
(Continued)

*Primary Examiner* — Robert S Carrico
(74) *Attorney, Agent, or Firm* — K&L Gates LLP

(57) ABSTRACT

A battery pack including: one or more battery cells; and a connector portion including a first terminal portion, wherein the connector portion is configured to be detachably engaged with a connection portion of an electrical device or a charging device including a second terminal portion and a drain hole, and wherein the first terminal portion is configured to be connected to the second terminal portion. The connector portion is configured to be detachably engaged with the connection portion by rotation, thereby closing the drain hole by a part of the connector portion.

17 Claims, 10 Drawing Sheets

(51) Int. Cl.
  *H01R 24/00* (2011.01)
  *H01M 2/30* (2006.01)
  *H01M 10/04* (2006.01)
  *H01M 10/0525* (2010.01)
  *H01M 10/42* (2006.01)
  *H02J 7/00* (2006.01)
  *H01M 10/46* (2006.01)
  *H01R 13/52* (2006.01)

(52) U.S. Cl.
  CPC ......... *H01M 2/30* (2013.01); *H01M 10/0422* (2013.01); *H01M 10/0525* (2013.01); *H01M 10/4257* (2013.01); *H01R 13/623* (2013.01); *H01R 24/005* (2013.01); *H02J 7/0042* (2013.01); *H01M 2/105* (2013.01); *H01M 2/1005* (2013.01); *H01M 10/46* (2013.01); *H01M 2010/4271* (2013.01); *H01R 13/5219* (2013.01); *H02J 7/0013* (2013.01)

(56) References Cited

U.S. PATENT DOCUMENTS

| | | | |
|---|---|---|---|
| 2010/0209752 A1* | 8/2010 | Lerner | H01M 2/1055 429/97 |
| 2012/0045667 A1* | 2/2012 | Yoneda | H01M 2/1044 429/7 |
| 2012/0121966 A1* | 5/2012 | Kim | H01M 2/06 429/158 |
| 2013/0196204 A1* | 8/2013 | Song | H01M 2/202 429/99 |

OTHER PUBLICATIONS

International Search Report issued in connection with International Patent Application No. PCT/JP2016/004196, dated Nov. 22, 2016. (2 pages).

Chinese Office Action dated May 26, 2020 in corresponding Chinese Application No. 201680062624.3.

* cited by examiner

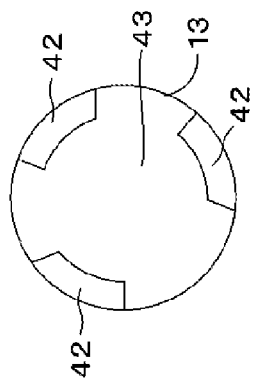
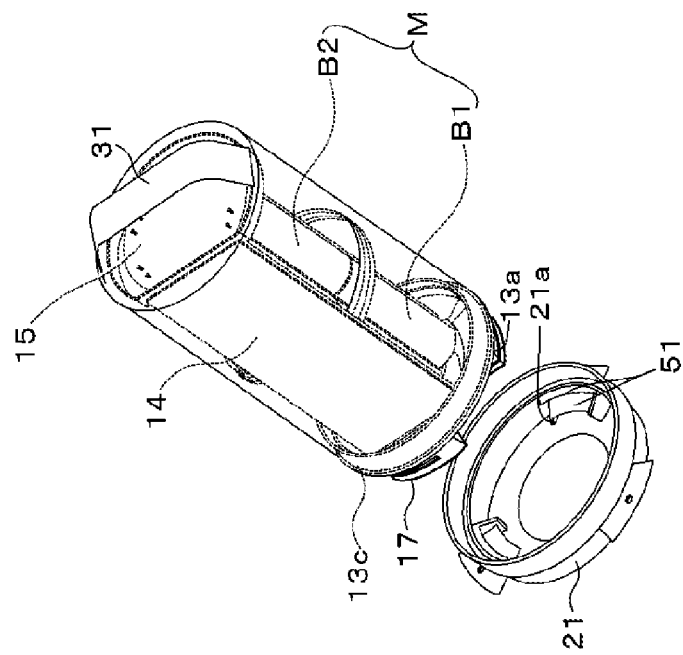
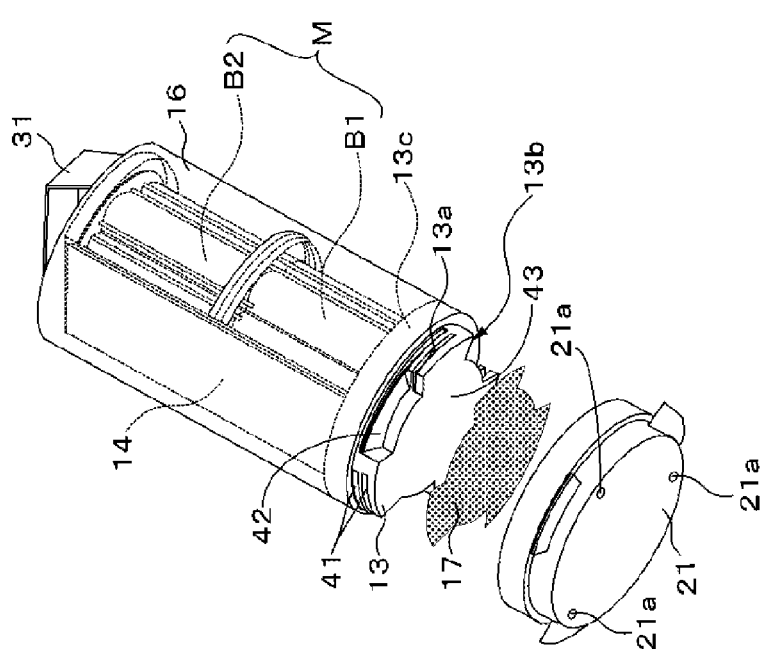

BATTERY PACK, ELECTRICAL DEVICE, AND CHARGING DEVICE

CROSS REFERENCE TO RELATED APPLICATIONS

The present application is a continuation of PCT patent application no. PCT/JP2016/004196, filed Sep. 14, 2016, which claims priority to Japanese patent application no. JP2015-214472 filed on Oct. 30, 2015, the entire contents of which are being incorporated herein by reference.

BACKGROUND

The present technology generally relates to a battery pack, an electrical device, and a charging device.

A secondary battery such as a lithium ion secondary battery is in broad use as a battery pack with a circuit such as a protection circuit added to one or more battery cells. The battery pack is used as a power source of an electrical device, and is connected to a charging device such as a charging holder and charged.

In the battery pack, insertion by sliding and fitting by a single point fulcrum are typically utilized for a battery case that houses a battery cell, thereby increasing the waterproofness of the battery pack.

SUMMARY

The present technology generally relates to a battery pack, an electrical device, and a charging device.

According to an embodiment, a battery pack is provided that can be connected to an electrical device or a charging device, thus enhancing waterproofness of the battery pack and in connection with the electrical device and the charging device.

According to an embodiment of the present disclosure, a battery pack is provided. The battery pack includes one or more battery cells; and a connector portion including a first terminal portion, wherein the connector portion is detachably engaged with a connection portion of an electrical device or a charging device including a second terminal portion and a drain hole, and wherein the first terminal portion is configured to be connected to the second terminal portion. The connector portion is engaged with the connection portion by rotation, and the drain hole is closed by a part of the connector portion.

In another embodiment, an electrical device is provided. The electrical device includes a battery pack; and an electrical device body having a connection portion that includes a second terminal portion and a drain hole. The battery pack includes one or more battery cells, and a connector portion that is detachably engaged with the connection portion, wherein the battery pack includes a first terminal portion configured to be connected to the second terminal portion. The connector portion is engaged with the connection portion by rotation, and the drain hole is closed by a part of the connector portion.

In a further embodiment, a charging device is provided. The charging device includes a connection portion detachably engaged with a connector portion of a battery pack including a first terminal portion, and the connection portion includes a second terminal portion configured to be connected to the first terminal portion, and a drain hole. The connector portion is engaged with the connection portion by rotation, and the drain hole is closed by a part of the connector portion.

According to the present technology in an embodiment, the waterproofness of the battery pack and in connection with one or both of the electrical device and the charging device can be enhanced. It should be understood that the present technology is not limited to enhancing waterproofness and that other suitable properties relating to the present technology may be realized and as further described herein.

BRIEF DESCRIPTION OF THE FIGURES

FIGS. 5A and 5B are perspective views showing an example of the battery pack according to an embodiment.

FIG. 5C is a plan view of a connector portion according to an embodiment.

DETAILED DESCRIPTION

The present disclosure generally relates to a battery pack, an electrical device, and a charging device. According to an embodiment, a battery pack is provided that can be connected to an electrical device or a charging device, thus enhancing waterproofness of the battery pack and in connection with the electrical device and the charging device. As described herein, embodiments of the present technology will be described with reference to the drawings.

First, one example of a configuration of a battery pack according to an embodiment of the present technology will be described with reference to FIG. 1, FIG. 2, and FIGS. 3A and 3B.

Figure 1:
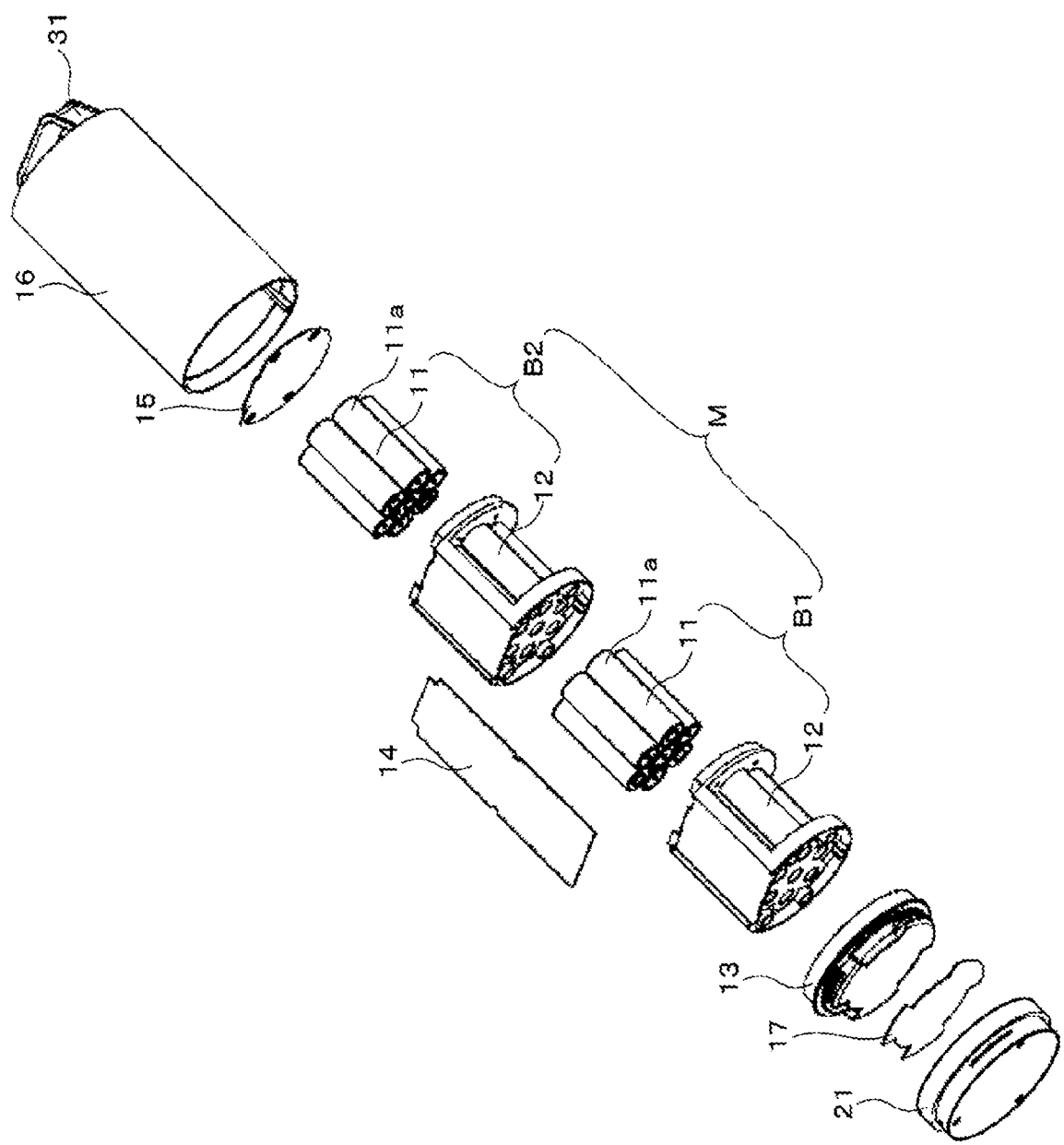
FIG. 1 is an exploded perspective view showing one example of a configuration of a battery pack according to an embodiment of the present technology.

As shown in FIG. 1, the battery pack includes a battery module M, a connector portion 13, a first circuit board 14, a second circuit board 15, a battery case 16, and a sealing member 17. In an embodiment, the sealing member 17 is provided in a connection portion 21 and not in the battery pack.

The battery module M includes one or more battery blocks (two battery blocks B1 and B2 in the example shown in FIG. 1). The battery blocks B1 and B2 each include an assembled battery 11 and a battery holder 12. The assembled battery 11 includes a plurality of battery cells 11a connected in series, in parallel, or in both series and parallel. The assembled battery 11 is electrically connected by a conductive member such as a connection terminal board, not shown, or the like.

Figure 2:
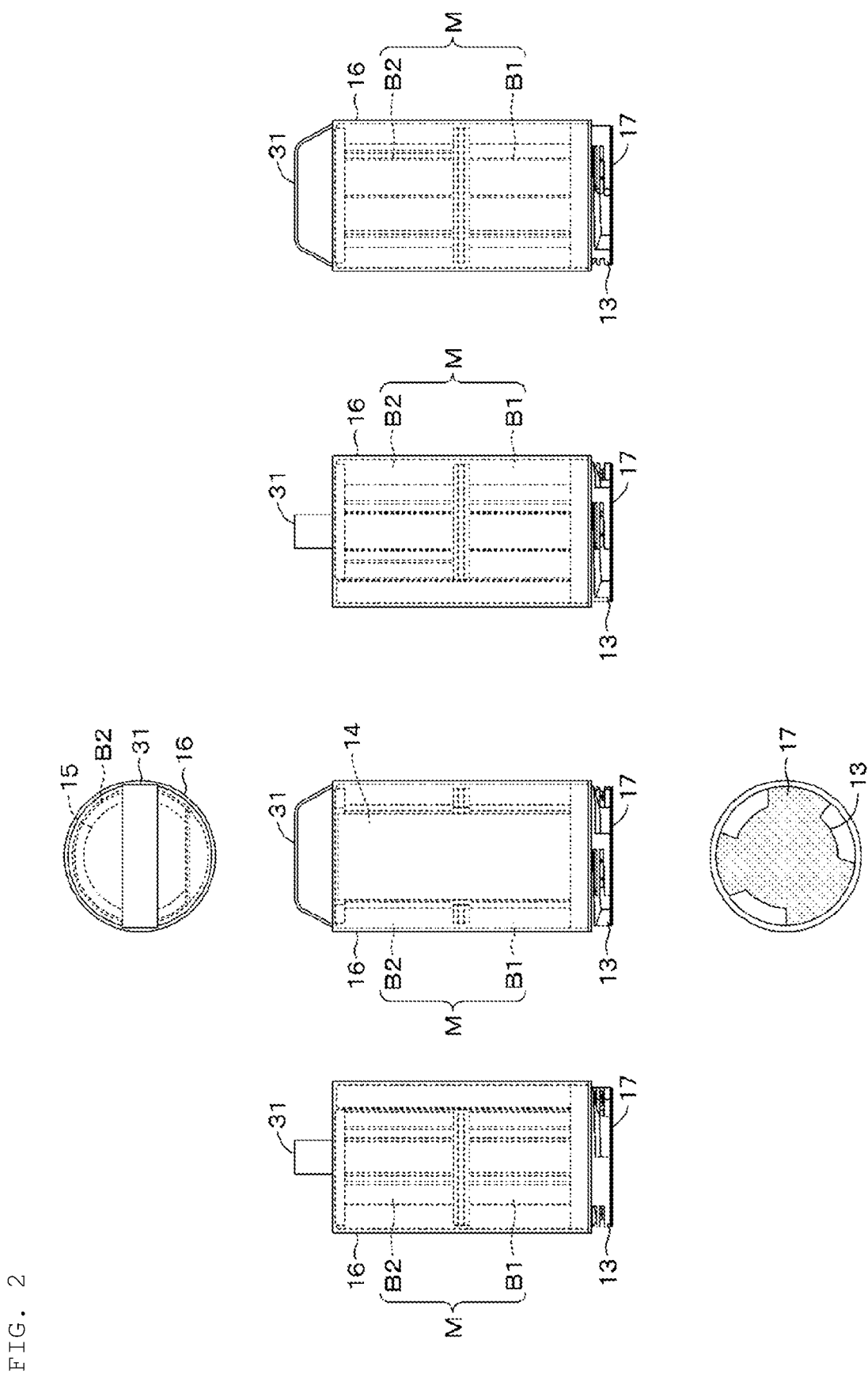
FIG. 2 is a top view, a bottom view, a front view, a rear view, a right side view, and a left side view illustrating an example of the battery pack according to an embodiment.
Figure 3A:
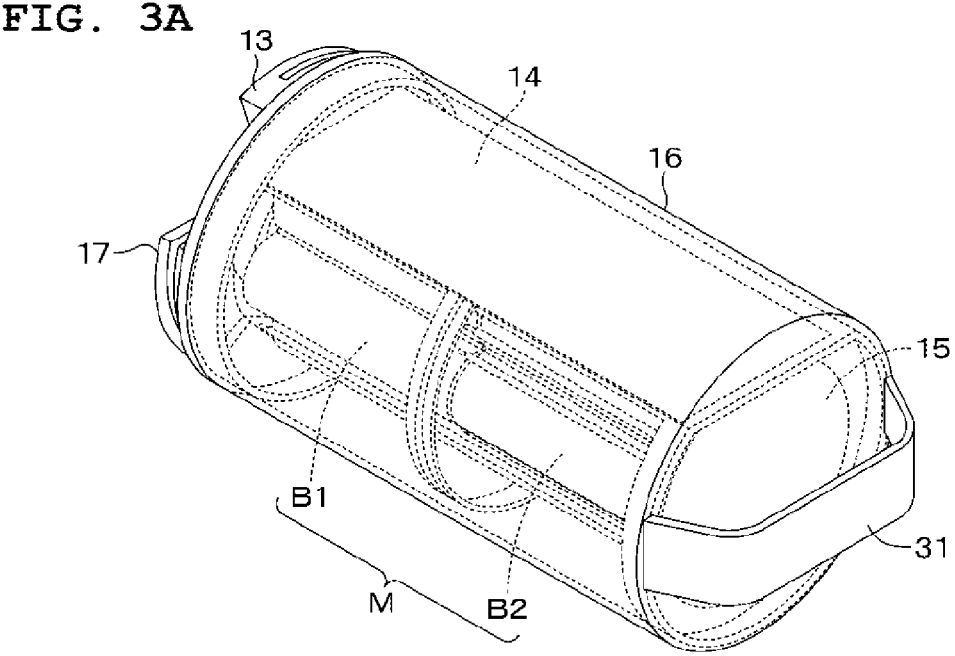
FIG. 3A is a perspective view of an upper face side illustrating an example of the battery pack according to an embodiment.
Figure 3B:
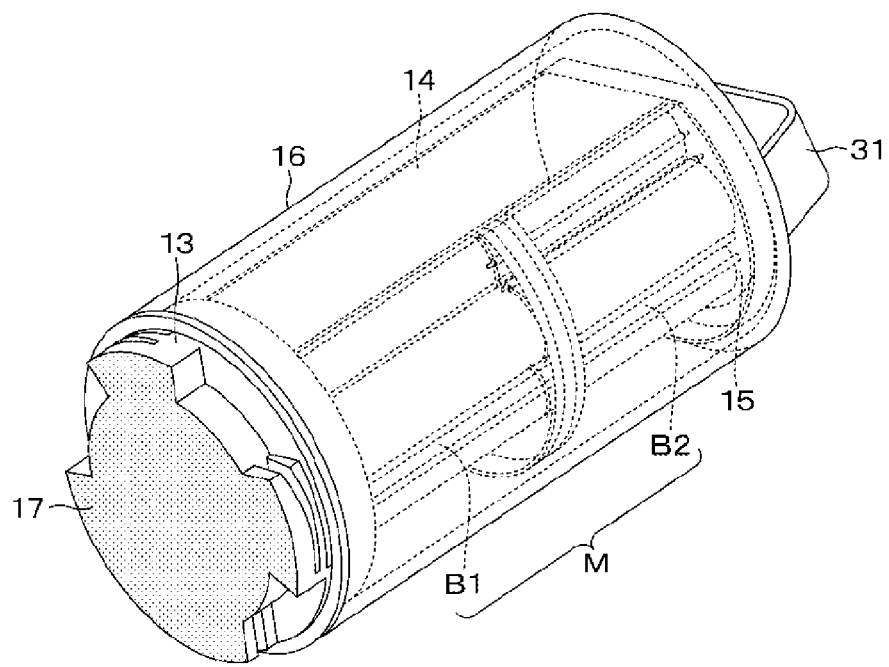
FIG. 3B is a perspective view of a lower face side illustrating an example of the battery pack according to an embodiment.

As shown in FIG. 2 and FIGS. 3A and 3B, the battery pack has, for example, a substantially columnar outer shape, and the connector portion 13 is provided in an electrical device body, not shown, or a charging device, not shown, and is detachably engaged with the connection portion 21 by rotation.

The battery case 16, in an embodiment, is a hollow structural body having one end face being opened, the other end face opposed to the one end face, and a peripheral face coupling the one end face and the other end face. The battery case 16 has, for example, a substantially cylindrical shape having a hollow structure with one end opened.

The battery blocks B1 and B2 (the battery module M), the first circuit board 14, and the second circuit board 15 are housed in the internal space of the battery case 16, and the opened one face of the battery case 16 is closed by the connector portion 13. The two battery blocks B1 and B2 are housed in the internal space of the battery case 16 in a stacked arrangement from the opened one end face of the battery case 16 toward the opposed other end face.

The first circuit board 14 and the second circuit board 15 are, for example, a main board and a connection board provided for controlling the operation of the battery pack and the like. In an embodiment, the first circuit board 14 and the second circuit board 15 include, for example, a charging/discharging control unit, a current detection circuit, a voltage detection circuit, a temperature detection unit, and the like, and combinations thereof.

A grip member 31 such as a handle portion may be provided on the other end face of the battery case 16. This makes it possible to improve the convenience of the rotation operation for rotating the battery pack and the convenience in carrying the battery pack.

One or more battery blocks (the two battery blocks B1 and B2 in one example shown in FIG. 1) are housed in the battery case 16 according to an embodiment.

The assembled battery 11 included in each of the battery blocks B1 and B2 includes a plurality of battery cells 11a. In an alternative embodiment, a single cell (e.g., one battery cell 11a) may be used in place of the assembled battery 11. In FIG. 1 according to an embodiment, the assembled battery 11 includes, for example, seven battery cells 11a connected in series, and two assembled batteries 11 are connected in parallel. That is, in this battery pack, 14 battery cells 11a are connected in 7 series and 2 parallels according to an embodiment.

The battery cell 11a, in an embodiment, is a secondary battery such as a cylindrical lithium ion secondary battery. It should be appreciated and understood that the battery cell 11a is not limited to a lithium ion secondary battery, and the shape of the battery is not limited to a cylindrical shape, but it may be a rectangular shape or the like. It should be further appreciated and understood that the number of battery cells 11a of the assembled battery 11 is not limited to seven and may include any suitable number and further that the number of battery cells 11a of the battery block B1 may be different from the number of battery cells 11a of the battery block B2.

The battery holder 12 includes, for example, a resin molded article including a resin having electrical insulation properties. The battery holder 12 has a top face portion, a bottom face portion opposed to the top face portion, and a peripheral portion coupling the top face portion and the bottom face portion. The peripheral portion has a curved face portion and a rectangular flat face portion. The curved face portion has a shape in which a plurality of curved faces, each having a shape corresponding to a part of the peripheral face of the battery cell 11a, are coupled. Two opposing sides of the flat face portion are coupled to the curved face portion. A step corresponding to the substantial thickness of the circuit board is provided in the flat face portion, the curved face portion, and the coupling portion, thereby forming a recess with the flat face portion taken as the bottom face. The first circuit board 14 is disposed and fixed in this recess.

The battery holder 12 has a plurality of battery cell housing spaces each corresponding to the shape of one battery cell 11a that penetrates from the top face portion to the bottom face portion. The plurality of battery cell housing spaces are provided in predetermined arrangement, and the plurality of battery cells 11a housed therein are fixed in predetermined arrangement to constitute the assembled battery 11.

Figure 4A:
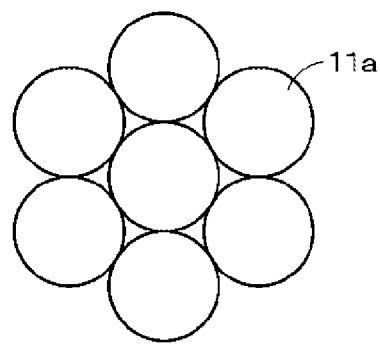
FIGS. 4A, 4B and 4C are pseudo schematic views showing an example of placement of battery cells according to an embodiment.
Figure 4B:
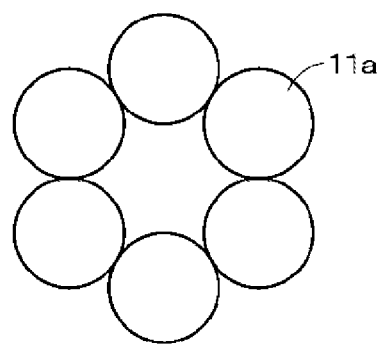
Figure 4C:
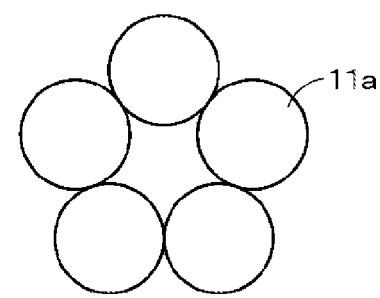

For example, as shown in FIGS. 4A to 4C, the assembled battery 11 is preferably disposed so as to be rotationally symmetrical in a plan view. The rotationally symmetric shape means that the shape agrees with a shape before rotation at every predetermined rotation angle. The battery holder 12 preferably has a plurality of battery cell housing spaces corresponding to the respective arrangements of the battery cells 11a shown in FIGS. 4A to 4C. Thus, the rotation of the battery pack for rotatingly engaging the connector portion 13 with the connection portion 21 can be performed more smoothly.

In an embodiment of the assembled battery 11 of FIG. 4A, one or more battery cells 11a (one battery cell in the example of the figure) are centered and a plurality of battery cells (six in the example of the figure) are equally arranged on the circumference. In an embodiment of the assembled battery 11 in FIG. 4B and FIG. 4C, a plurality of battery cells (six or five in the example of each of the figures) are evenly arranged on the circumference.

The top face portion of the battery holder 12 has a plurality of first fitting portions, and the lower face portion of the battery holder 12 has a second fitting portion. The first fitting portion of the battery holder 12 is formed so as to be engageable with both the second fitting portion of the battery holder 12 and a third fitting portion of the connector portion 13.

In the two stacked battery blocks B1 and B2, the first fitting portion of one battery holder 12 is fitted to the third fitting portion of the connector portion 13, and the second fitting portion of the one battery holders 12 is fitted to the first fitting portion of the other battery holder 12, to fix the two battery blocks B1 and B2 in stacked placement.

The first fitting portion and the second fitting portion of the battery holder 12, the first fitting portion of the battery holder 12, and the third fitting portion of the connector portion 13 may only have structures fittable to each other in an embodiment. For example, the first fitting portion of the battery holder 12 is in the form of a hole, and the second fitting portion and the third fitting portion of the connector portion 113 are protruding structures that fit into the hole of the first fitting portion.

According to an embodiment, the connector portion and the connection portion will be described with reference to FIGS. 5A to 5C.

The connector portion 13 includes, for example, a resin molded article using an insulating resin, or the like. The connector portion 13, in an embodiment, is configured as a metal connection component for electrically connecting the electrical device body and the battery pack, and includes a first terminal portion 13a that is connected to a second terminal portion, not shown, of the connection portion 21. The first terminal portion 13a is electrically connected to a battery block or the like and serves as a terminal of the battery pack. The connector portion 13 is provided at one end of the battery case 16 and also functions as a lid for closing the opening of the battery case 16.

The connector portion 13 is detachably engaged with the connection portion 21 by rotation. One example of the connector portion 13 includes an engaging portion 13b and a tubular peripheral wall portion 13c having one end face opened and the other end face provided with the engaging portion 13b. The peripheral wall portion 13c fits into the opening of the battery case 16 and the opening of the battery case 16 is covered by the engaging portion 13b.

The engaging portion 13b of the connector portion 13 includes a first engagement portion 41, a positioning space portion 42 for rotational engagement, and a sealing member pressing portion 43. For example, the engaging portion 13b of the connector portion 13 has a sealing member pressing portion 43 provided in a planar shape substantially perpendicular to the rotation axis. The engaging portion 13b of the connector portion 13 has the first engagement portion 41 and the positioning space portion 42 for rotational engagement at a peripheral portion coupled to the peripheral edge of the sealing member pressing portion 43.

The positioning space portion 42 is provided so as to be inserted with a second engagement portion 51 of the connection portion 21 before the rotational engagement, to thereby match the position of engagement between the first engagement portion 41 of the connector portion 13 and the second engagement portion 51.

The positioning space portion 42 includes, for example, a recess provided in the peripheral portion. For example, a plurality of first engagement portions 41 and a plurality of positioning space portions 42 are equally arranged alternately on the circumference in a plan view, so that the plurality of second engagement portions 51 of the connection portion 21, inserted in the plurality of positioning space portions 42, and the plurality of first engagement portions 41 are simultaneously engaged by rotation.

The sealing member pressing portion 43 defines a portion where the sealing member 17 is in close contact. The sealing member 17 may be disposed in advance in the sealing member pressing portion 43 so as to be in close contact with the sealing member pressing portion 43, or the sealing member 17 may be provided at a predetermined position of the connection portion 21 so that the sealing member pressing portion 43 comes into close contact with the sealing member 17 after moving in the rotation axis direction with the rotation of the connector portion 13.

The sealing member pressing portion 43 moves toward the connection portion 21 in the rotation axis direction with the rotation by the rotational engagement between the first engagement portion 41 and the second engagement portion 51 of the connection portion 21, and presses the sealing member 17 in close contact with at least a part of the sealing member pressing portion 43.

The connection portion 21 of the electrical device body includes the second terminal portion, not shown, of the electrical device body and the second engagement portion 51 which is engaged with the first engagement portion 41 of the connector portion 13, and includes a drain hole 21a for drainage at a predetermined position. The drain hole 21a is provided for draining water so as to prevent the metal member or the like from being submerged and deteriorating due to accumulation of water in the connection portion 21 when the battery pack is not connected. In a state where the battery pack is connected to the connection portion 21, unless the drain hole 21a is closed, moisture might enter the connected portion to cause occurrence of contact failure or the like.

In an embodiment, the connection portion 21, for example, a peripheral wall portion is provided standing in contact with the bottom face portion and the peripheral edge of the bottom face portion, where the second engagement portion 51 is formed in the peripheral wall portion, and where the drain hole 21a for drainage is provided in the bottom face portion.

A sealing member 17 is provided at a predetermined position of the connector portion 13. It should be appreciated and understood that the sealing member 17 may only be provided at a predetermined position of at least one of the connector portion 13 and the connection portion 21. In an embodiment shown in FIG. 1, the sealing member 17 has a planar shape corresponding to the sealing member pressing portion 43, and is provided so as to come into close contact with the sealing member pressing portion 43 of the connector portion 13.

The sealing member 17 is, for example, a sealing member that covers the drain hole 21a, or a sealing member that is disposed at a predetermined position such as a sealing member that surrounds the peripheral edge of the drain hole. It should be appreciated and understood that the sealing member can be any suitable configuration, such as, an O ring. The sealing member 17 in the pressed state can prevent entry of moisture from between the connector portion 13 and the drainage hole 21a as well as the peripheral edge of the drain hole 21a. This makes it possible to obtain excellent waterproofness even with the connector portion 13 and the connection portion 21 in the connected state. In an embodiment, there may be disposed another sealing member that covers a portion requiring waterproofing other than the drain hole 21a, another sealing member that surrounds a portion requiring waterproofing, or other suitable member.

The sealing member 17 includes a member having flexibility, such as an elastic member including, for example, a rubber material. Examples of the rubber material include nitrile rubber, styrene rubber, silicon rubber, fluorine rubber, styrene butadiene rubber, butadiene rubber, isoprene rubber, acrylic rubber, acrylonitrile butadiene rubber and the like and combinations thereof.

Figure 6A:
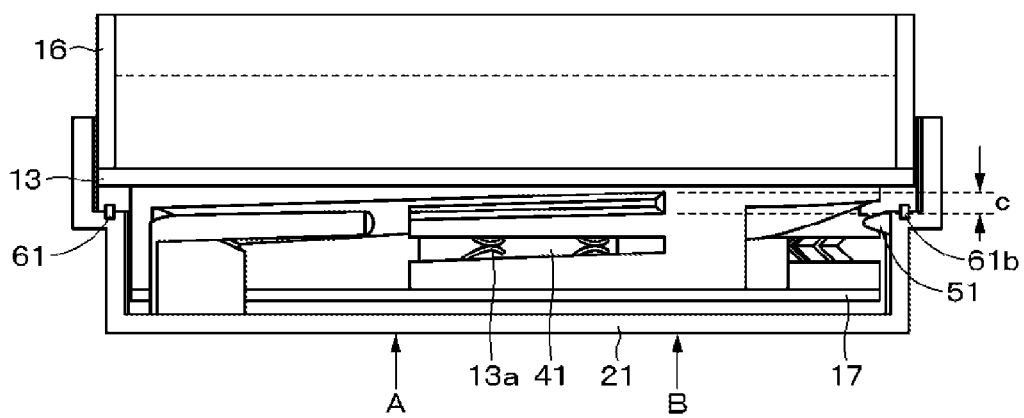
FIG. 6A is a schematic view of the battery pack in which the connector portion is inserted in a connection portion, viewed from the side according to an embodiment.
Figure 6B:
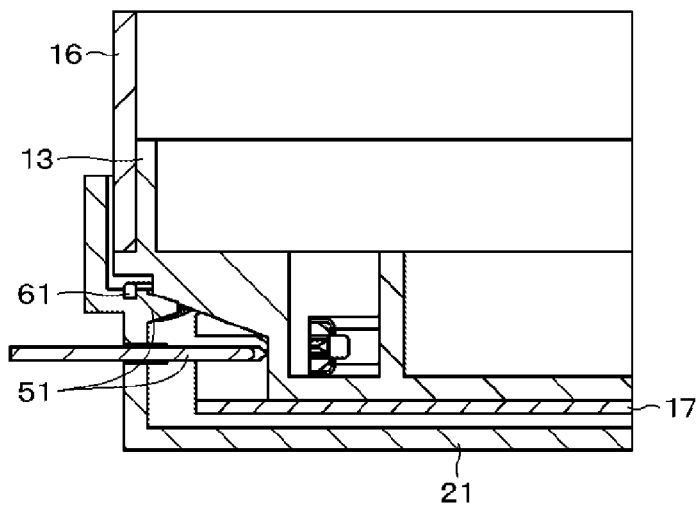
FIG. 6B is a schematic sectional view showing a part of the cross section at a position A in FIG. 6A before rotation according to an embodiment.
Figure 6C:
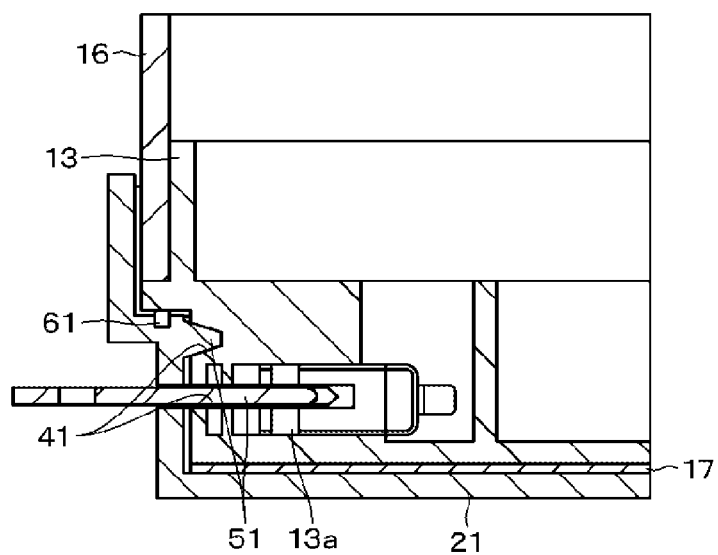
FIG. 6C is a schematic sectional view showing a part of the cross section at a position B in FIG. 6A after rotational engagement according to an embodiment.
Figure 7A:
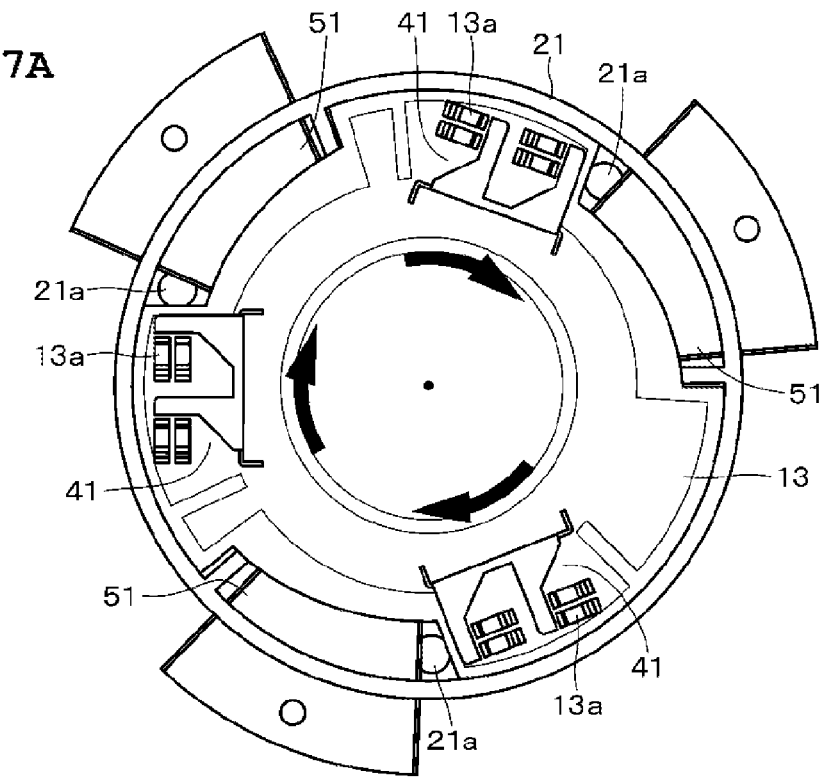
FIG. 7A is a schematic view of a transverse section of the battery pack in which the connector portion has been inserted in a connection portion according to an embodiment.
Figure 7B:
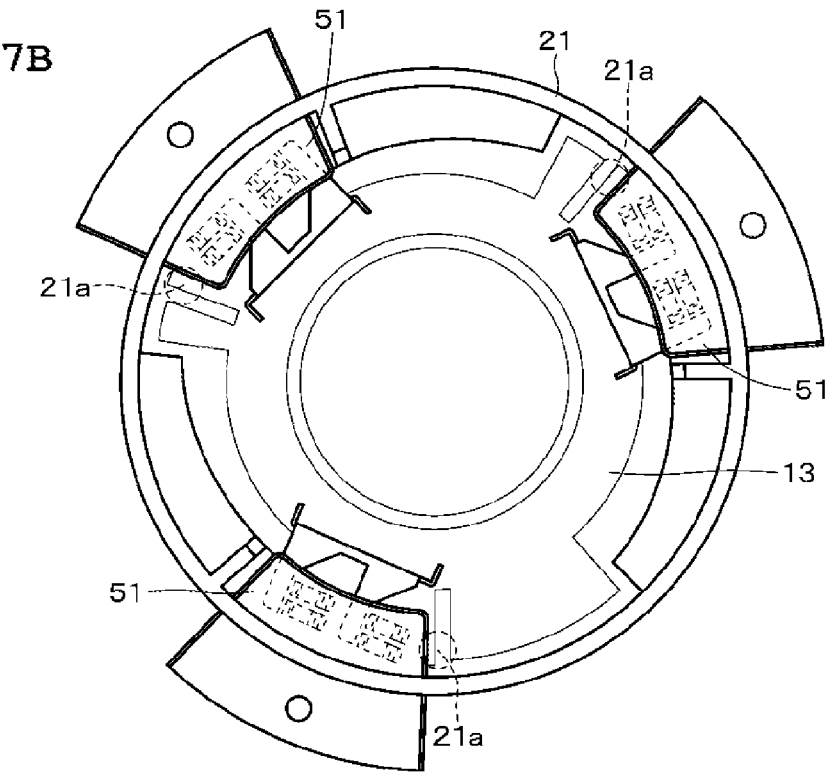
FIG. 7B is a schematic view of a transverse section of the battery pack after rotation of the connector portion from the state of FIG. 7A according to an embodiment.

The engagement of the connector portion and the connection portion will be described with reference to FIGS. 6A to 6C and FIGS. 7A to 7B according to an embodiment. FIG. 6A is a schematic view of the battery pack in which the connector portion is inserted in the connection portion, viewed from the side. FIG. 6B is a schematic sectional view showing a part of the cross section at a position A in FIG. 6A before rotation. FIG. 6C is a schematic sectional view showing a part of the cross section at a position B in FIG. 6A after rotational engagement. FIG. 7A is a schematic view of a transverse section of the battery pack in which the connector portion is inserted in the connection portion. FIG. 7B is a schematic view of a transverse section of the battery pack after rotation of the connector portion from the state of FIG. 7A.

When the connector portion 13 is engaged with the connection portion 21, the connector portion 13 rotates with the rotation of the entire battery pack, thereby leading to engagement of the first engagement portion 41 of the connector portion 13 and the second engagement portion 51 of the connection portion 21.

As shown in FIGS. 6A to 6C, by the rotational engagement of the first engagement portion 41 of the connector portion 13 and the second engagement portion 51 of the connection portion 21, the engaging portion 13b of the connector portion 13 moves toward the connection portion 21 in the rotation axis direction with the rotation, and is engaged with the connection portion 21. In this rotational engagement, for example, a movement distance c of the connector portion 13 in the rotation axis direction is generated. As shown in FIGS. 7A and 7B, in a state where the connector portion 13 and the connection portion 21 are engaged, the drain hole 21a is closed by a part of the connector portion 13 which has moved in the rotational direction (e.g., a part of the sealing member pressing portion 43).

In this engaged state, as shown in FIG. 6C, at least a part of the sealing member pressing portion 43 of the connector portion 13 is fixed in the state of being in close contact with the inner face of the connection portion 21 via the sealing member 17, and the sealing member 17 is pressed by the connector portion 13. Further, another sealing member 61, disposed in a portion requiring waterproofing or some other portion in the connection portion 21, is also pressed by a part of the connector portion 13.

In an embodiment, the first engagement portion 41 of the connector portion 13 includes one or more recessed grooves or the like formed along the rotational direction inclined in the rotation axis direction. In an embodiment, the second engagement portion 51 of the connection portion 21 includes one or more structures that can be engaged with the recessed grooves (first engagement portions 41) and are formed along the rotational direction inclined in the rotation axis direction. The structures are, for example, one or more plate-type members are provided so as to protrude from the peripheral wall portion toward the rotation axis.

In an embodiment of the connector portion 13 and the connection portion 21, the first engagement portion 41 provided on the peripheral portion of the engaging portion 13b of the connector portion 13 and the second engagement portion 51 provided on the peripheral wall portion of the connection portion 21 are engaged with each other while moving in the rotation axis direction with the rotation. Accordingly, the sealing member pressing portion 43 provided in a planar shape substantially perpendicular to the rotation axis direction moves toward the connection portion 21, to press the sealing member 17 in close contact with the top of the sealing member pressing portion 43. Hence the sealing member 17 comes into the pressed state, to be able to close the drain hole 21a covered by the sealing member 17 without a gap. As a result, enhanced waterproofness can be obtained. It should be appreciated and understood that a portion that comes into close contact with the sealing member 17 and press the sealing member 17 may be a part of the connector portion 13 other than the sealing member pressing portion 43.

The first engagement portion 41 may include the first terminal portion 13a. The second engagement portion 51 of the connection portion 21 may include the second terminal portion (not shown). In this case, at the engagement portions of the first engagement portion 41 and the second engagement portion 51, the first terminal portion 13a and the second terminal portion come into contact with each other, to establish electrical connection therebetween. At this time, the engagement between the first engagement portion 41 and the second engagement portion 51 may be fixed. For example, as shown in FIG. 6C, the first terminal portion 13a may be made up of spring contact members such as two oppositely disposed spring plates, and the second engagement portion 51 may be fixed in the state of being inserted into the opposed gap of the contact members.

The structure of the first engagement portion of the connector portion and the engagement portion of the second engagement portion of the connection portion are described as follows according to an embodiment.

Figure 8A:
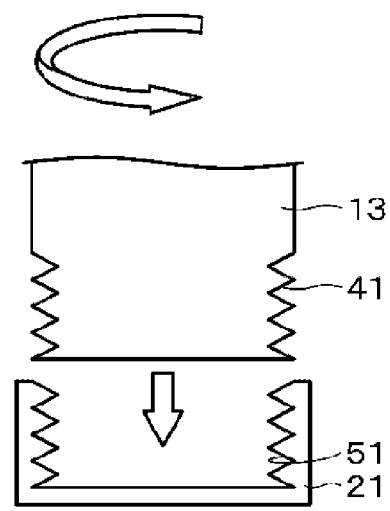
FIGS. 8A to 8C are schematic views illustrating a further embodiment of an engagement structure of the first engagement portion of the connector portion and the second engagement portion of the connection portion.
Figure 8B:
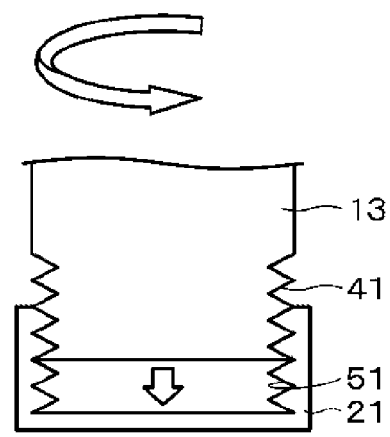
Figure 8C:
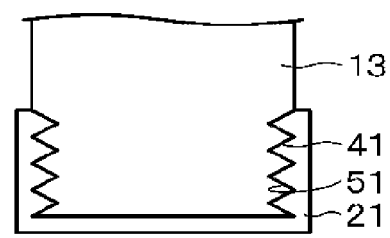
Figure 9A:
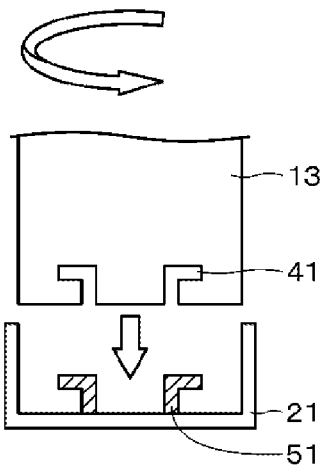
FIGS. 9A to 9D are schematic views showing another embodiment of the engagement portion structure of the first engagement portion of the connector portion and the second engagement portion of the connection portion.
Figure 9B:
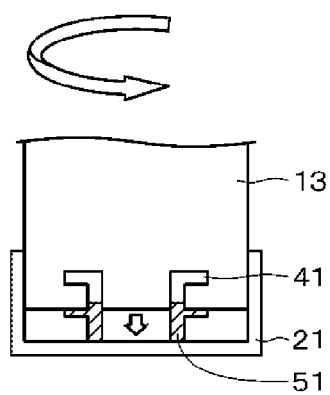
Figure 9C:
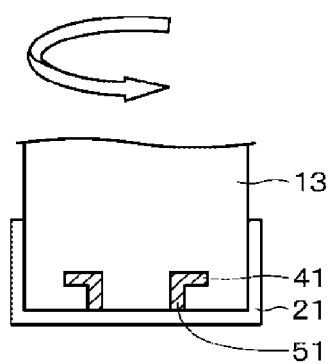
Figure 9D:
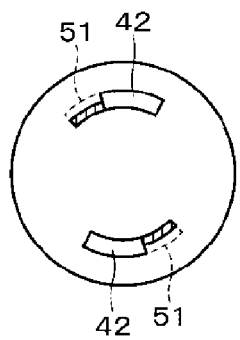

The engagement portion structure of the first engagement portion of the connector portion and the second engagement portion of the connection portion will be described with reference to FIGS. 8A to 8C according to an embodiment relating to a screw system.

In an embodiment, the connector portion 13 has a thread groove portion as the first engagement portion 41, and the connection portion 21 has a threaded portion into which the thread groove portion is screwed as the second engagement portion 51. By rotation, the first engagement portion 41 is screwed into the second engagement portion 51 of the connection portion 21, and the connector portion 13 moves toward the connection portion 21 in the rotation axis direction with the rotation, and engaged with the connection portion 21.

The engagement portion structure of the first engagement portion 41 of the connector portion 13 and the second engagement portion 51 of the connection portion 21 will be described with reference to FIGS. 9A to 9D according to a lock shape system.

In an embodiment, the connector portion 13 has a space corresponding to the shape of a lock portion as the first engagement portion 41, and has a space that the entire lock portion can enter as the positioning space portion 42 for rotational engagement. First, the entire lock portion (second engagement portion 51) of the connection portion 21 is inserted into the positioning space portion 42 and moves toward the connection portion 21 in the rotation axis direction with the rotation of the connector portion 13, and the lock portion (second engagement portion 51) of the connection portion 21 is engaged with the space (first engagement portion 41) corresponding to the shape of the lock portion of the connector portion 13. Accordingly, the connector portion 13 moves toward the connection portion 21 in the rotation axis direction with the rotation, and is engaged with the connection portion 21.

In an embodiment, an electrical device including the battery pack and a charging device for charging the battery pack will be described.

Figure 10:
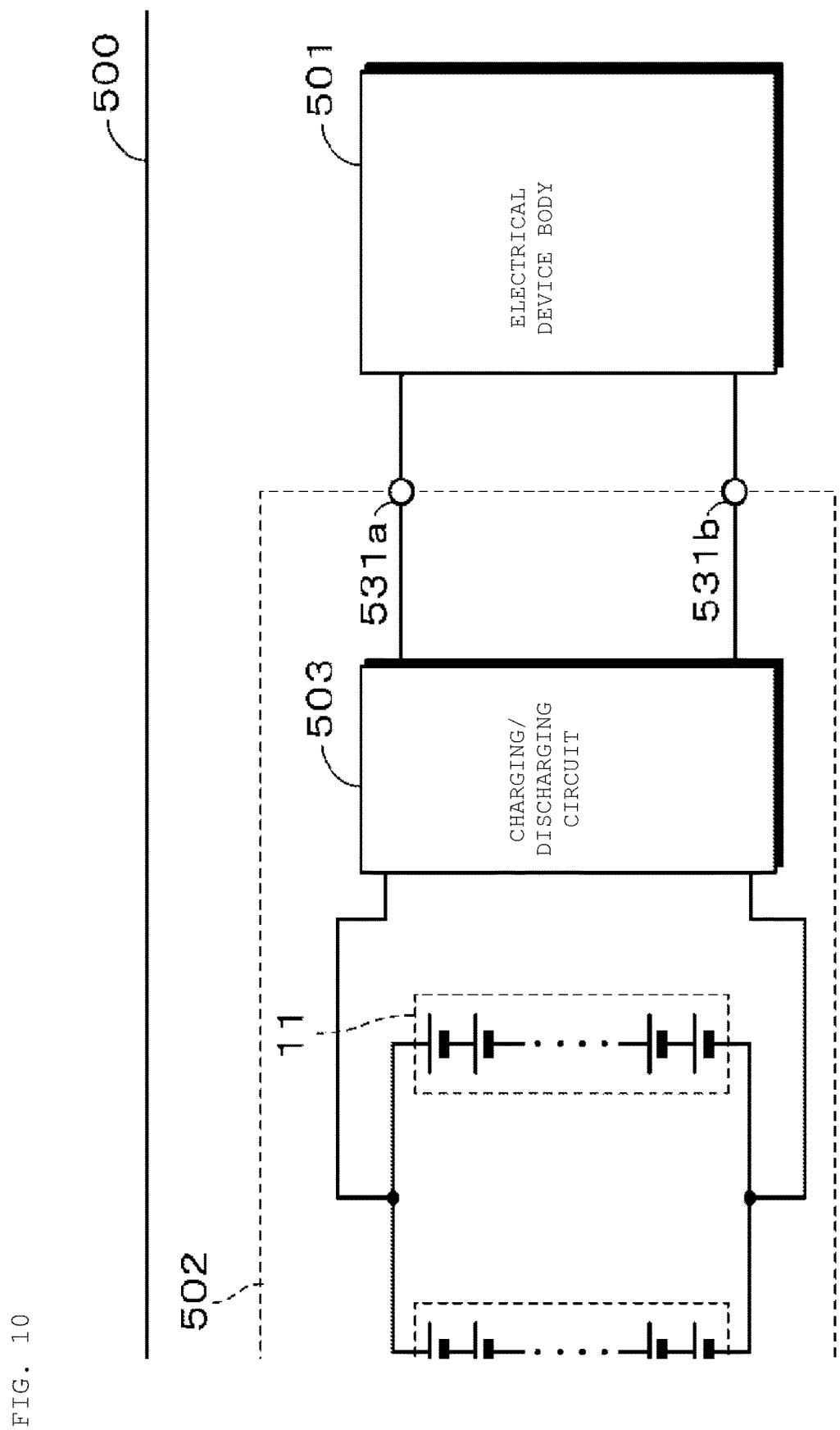
FIG. 10 is a block diagram showing an example of a configuration of an electrical device according to an embodiment of the present technology.

A configuration of an electrical device 500 according to an embodiment of the present technology will be described with reference to FIG. 10.

Examples of the electrical device 500 include power tools such as an electric motorcycle, an electric bicycle, an electric power assisted bicycle, a hybrid car, an electric flying object (electric unmanned aerial vehicle), and an electric power tool. The electrical device 500 is not limited to these, and examples of the electrical device 500 other than the above include a notebook type personal computer, a tablet type computer, a mobile phone (e.g., a smart phone), personal digital assistants (PDA), imaging devices (e.g., a digital still camera, a digital video camera, etc.), an audio device, a game device, a navigation system, an electric shaver, a refrigerator, an air conditioner, a television, a stereo, a water heater, a microwave oven, a dishwasher, a washing machine, a drier, a lighting device, a toy, medical equipment, a robot, a road conditioner, a traffic light and the like.

The electrical device 500 includes an electrical device body 501 and a battery pack 502. The electrical device 500 is configured such that, for example, the battery pack 502 is removable by a user. The battery pack 502 has a configuration as described herein that includes the connector portion 13, and the electrical device body 501 has the connection portion 21 as described herein that is engaged with the connector portion 13 of the battery pack 502 by rotation. The connector portion 13 of the battery pack 502 and the connection portion 21 of the electrical device body 501 are engaged by rotation and removed by rotation.

The battery pack 502 includes a positive electrode terminal 531a and a negative electrode terminal 531b. In charging, the positive electrode terminal 531a and the negative electrode terminal 531b are respectively connected to a positive electrode terminal and a negative electrode terminal of the charging device, not shown, and charging is performed. In use of the electrical device, the positive electrode terminal 531a and the negative electrode terminal 531b are respectively connected to the positive electrode terminal and the negative electrode terminal of the electrical device body 501, and discharging is performed. The positive electrode terminal 531a and the negative electrode terminal 531b are included, for example, in the first terminal portion 13a described above.

The battery pack 502 includes a plurality of assembled batteries 11 connected in series, in parallel or in series and in parallel, and a charging/discharging circuit 503. It should be appreciated and understood that a configuration in which the charging/discharging circuit 503 is provided in each of the assembled batteries 11 may be adopted. The plurality of assembled batteries 11 connected in series, in parallel, or both are electrically connected to the charging/discharging circuit 503. The charging/discharging circuit 503 is electrically connected to the electrical device body 501 via the positive electrode terminal 531a and the negative electrode terminal 531b.

In charging, the charging/discharging circuit 503 controls charging of the assembled batteries 11. Meanwhile, in discharging (that is, in use of the electrical device 500), the charging/discharging circuit 503 controls discharging to the electrical device body 501.

The electrical device body 501 receives electric power from the battery pack 502 via the positive electrode terminal 531a and the negative electrode terminal 531b.

The charging device is, for example, a charging holder including the connection portion 21, or the like. By connection of the connector portion 13 of the battery pack 502 to the connection portion 21 of the charging device, the connector portion 13 and the connection portion 21 of the charging device are connected and charging is performed.

Although the embodiments of the present technology have been specifically described above, the present technology is not limited to the embodiments described above, where various suitable modifications and applications are possible and should be appreciated and understood.

For example, the configurations, methods, processes, shapes, materials, numerical values, and the like mentioned in the above embodiments are merely examples, and different configurations, methods, processes, shapes, materials, numerical values and the like from these may be used, as necessary.

Further, the configurations, methods, processes, shapes, materials, numerical values, and the like of the embodiments described above can be combined with each other in any suitable manner.

The present technology is described below in further detail according to an embodiment.

[1]

A battery pack, including; one or more battery cells; and a connector portion that is detachably engaged with a connection portion of one of both of an electrical device and a charging device, including a second terminal portion and a drain hole, and includes a first terminal portion to be connected to the second terminal portion, in which the connector portion is configured to be engaged with the connection portion by rotation such that the drain hole is closed by a part of the connector portion.

[2]

The battery pack according to [1], including a sealing member disposed on one or both of the connector portion and the connection portion, in which the connector portion is configured to move toward the connection portion in a rotation axis direction with rotation so as to press the sealing member.

[3]

The battery pack according to [2], in which the connector portion is configured to press the sealing member covering the drain hole.

[4]

The battery pack according to any one of [1] to [3], in which the drain hole is closed by a part of the connector portion having moved in a rotational direction.

[5]

The battery pack according to any one of [1] to [4], in which the connection portion includes a second engagement portion, and the connector portion includes a first engagement portion that is configured to be engaged with the second engagement portion by rotation.

[6]

The battery pack according to [5], in which the first engagement portion and the second engagement portion are formed along the rotational direction.

[7]

The battery pack according to [5], in which the first engagement portion includes the first terminal portion, the first terminal portion includes spring contact members disposingly opposed in arrangement, and the second engagement portion is fixed in the state of being inserted in an opposed gap of the spring contact members.

[8]

The battery pack according to any one of [1] to [7], further including a battery holder in which the battery cells are housed.

[9]

The battery pack according to [8], in which in the battery holder, the battery cells are arranged and fixed so as to have a rotationally symmetrical shape in a plan view.

[10]
The battery pack according to claim [8], further including a case which has one end face being opened, the other end face opposed to the one end face, and a peripheral face coupling between the one end face and the other end face, and houses the battery holder and the battery cells, and in which the one end face being opened is closed by the connector portion.

The battery pack according to [10], in which the case has a grip portion provided on the other end face.

[12]
The battery pack according to any one of [10] to [11], in which the case has a cylindrical shape.

[13]
The battery pack according to any one of [10] to [12], in which a circuit board for controlling charging and discharging of the battery cells is housed in the case.

[14]
An electrical device, including:
a battery pack; and
an electrical device body having a connection portion that includes a second terminal portion and a drain hole,
in which
the battery pack includes
one or more battery cells; and
a connector portion detachably engaged with the connection portion and including a first terminal portion to be connected to the second terminal portion, and
the connector portion is configured to be engaged with the connection portion by rotation, and the drain hole is closed by a part of the connector portion.

[15]
A charging device, including
a connection portion, with which a connector portion of a battery pack including a first terminal portion is detachably engaged, and which includes a second terminal portion to be connected to the first terminal portion, and a drain hole,
in which
the connector portion is configured to be engaged with the connection portion by rotation, and the drain hole is closed by a part of the connector portion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack, comprising:
one or more battery cells in a battery case; and
a connector portion including a first terminal portion,
wherein the connector portion is configured to be detachably engaged with a connection portion of an electrical device or a charging device including a second terminal portion and a drain hole, wherein the first terminal portion is configured to be connected to the second terminal portion,
wherein the connector portion is configured to be detachably engaged with the connection portion by rotation, thereby closing the drain hole by a part of the connector portion,
wherein the connector portion includes a tubular peripheral wall portion, a plurality of engaging portions and positioning space portions, and the engaging portions are extending radially outward from a sealing member pressing portion of the connector portion,
wherein the tubular peripheral wall portion fits into an opening of the battery case, and
wherein the first terminal portion is provided in the engaging portions and the engaging portions are outside the battery case.

2. The battery pack according to claim 1, further comprising a sealing member disposed on the connector portion,
wherein the connector portion is configured to be moved toward the connection portion in a rotation axis direction with rotation so as to provide a press engagement associated with the sealing member.

3. The battery pack according to claim 2, wherein the connector portion is in the press engagement with the sealing member thereby covering the drain hole.

4. The battery pack according to claim 1, wherein the drain hole is closed by the part of the connector portion having moved in a rotational direction.

5. The battery pack according to claim 1, wherein
the connection portion includes a second engagement portion, and
wherein the connector portion includes a first engagement portion that is configured to be engaged with the second engagement portion by rotation.

6. The battery pack according to claim 5, wherein the first engagement portion and the second engagement portion are provided along the rotational direction.

7. The battery pack according to claim 5,
wherein the first terminal portion includes spring contact members disposed opposite in arrangement, and
wherein the second engagement portion is in a fixed state upon insertion in an opposed gap of the spring contact members.

8. The battery pack according to claim 5, wherein the first engagement portion includes a threaded groove portion.

9. The battery pack according to claim 5, wherein the first engagement portion includes a lock portion.

10. The battery pack according to claim 1, further comprising
a battery holder in which the battery cells are housed.

11. The battery pack according to claim 10, wherein in the battery holder, the battery cells are arranged and fixed with a rotationally symmetrical shape in a plan view.

12. The battery pack according to claim 10, wherein
the battery case includes a first end face being opened, a second end face opposed to the first end face, and a peripheral face coupling between the first end face and the second end face, and wherein the battery case houses the battery holder and the battery cells, and wherein the first end face is closable by the connector portion.

13. The battery pack according to claim 12, wherein the case includes a grip portion provided on the second end face.

14. The battery pack according to claim 12, wherein the case has a cylindrical shape.

15. The battery pack according to claim 12, wherein a circuit board for controlling charging and discharging of the battery cells is housed in the case.

16. The battery pack according to claim 12, wherein the case has a hollow structural body.

17. An electrical device, comprising:
a battery pack; and
an electrical device body having a connection portion that includes a second terminal portion and a drain hole, wherein
the battery pack includes
- one or more battery cells in a battery case; and
- a connector portion including a first terminal portion, wherein the connector portion is configured to be detachably engaged with the connection portion of the electrical device body,
- wherein the first terminal portion is configured to be connected to the second terminal portion,
- wherein the connector portion is configured to be detachably engaged with the connection portion by rotation, thereby closing the drain hole by a part of the connector portion,
- wherein the connector portion includes a tubular peripheral wall portion, a plurality of engaging portions and positioning space portions, and the engaging portions are extending radially outward from a sealing member pressing portion of the connector portion,
- wherein the tubular peripheral wall portion fits into an opening of the battery case, and
- wherein the first terminal portion is provided in the engaging portions and the engaging portions are outside the battery case.

* * * * *